(12) United States Patent
Wang et al.

(10) Patent No.: US 11,861,886 B2
(45) Date of Patent: Jan. 2, 2024

(54) METHOD AND APPARATUS FOR GENERATING VIDEO DESCRIPTION INFORMATION, AND METHOD AND APPARATUS FOR VIDEO PROCESSING

(71) Applicant: TENCENT TECHNOLOGY (SHENZHEN) COMPANY LIMITED, Guangdong (CN)

(72) Inventors: Bai Rui Wang, Shenzhen (CN); Lin Ma, Shenzhen (CN); Wen Hao Jiang, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 383 days.

(21) Appl. No.: 17/245,168

(22) Filed: Apr. 30, 2021

(65) Prior Publication Data
US 2021/0256977 A1    Aug. 19, 2021

Related U.S. Application Data

(63) Continuation of application No. PCT/CN2020/079478, filed on Mar. 16, 2020.

(30) Foreign Application Priority Data

Apr. 2, 2019   (CN) .......................... 201910263207.0

(51) Int. Cl.
*G06V 10/82*  (2022.01)
*G10L 15/02*  (2006.01)
(Continued)

(52) U.S. Cl.
CPC ............ *G06V 10/82* (2022.01); *G06V 10/806* (2022.01); *G06V 20/46* (2022.01); *G10L 15/02* (2013.01); *G10L 15/16* (2013.01); *G10L 15/26* (2013.01)

(58) Field of Classification Search
None
See application file for complete search history.

(56) References Cited

U.S. PATENT DOCUMENTS 10,455,297 B1 * 10/2019 Mahyar ............... H04N 21/4532
2018/0189572 A1 *  7/2018 Hori ........................ G06N 3/044
(Continued)

FOREIGN PATENT DOCUMENTS

CN     105279495 A     1/2016
CN     107256221 A    10/2017
(Continued)

OTHER PUBLICATIONS

International Search Report for PCT/CN2020/079478 dated Jun. 22, 2020 [PCT/ISA/210].
(Continued)

*Primary Examiner* — Stella L. Woo
(74) *Attorney, Agent, or Firm* — Sughrue Mion, PLLC

(57) ABSTRACT

The embodiments of the disclosure provide a video description information generation method, a video processing method, and video description information generation apparatus, and a video processing apparatus. The video description information generation method includes: obtaining a frame-level video feature sequence corresponding to a video; generating a global part-of-speech sequence feature of the video according to the video feature sequence, the global part-of-speech sequence feature being a feature of a sequence of a combination of parts of speech in the video; and generating natural language description information of
(Continued)

the video according to the global part-of-speech sequence feature and the video feature sequence.

17 Claims, 5 Drawing Sheets

(51) Int. Cl.
| | |
|---|---|
| *G10L 15/16* | (2006.01) |
| *G10L 15/26* | (2006.01) |
| *G06V 20/40* | (2022.01) |
| *G06V 10/80* | (2022.01) |

(56) References Cited

U.S. PATENT DOCUMENTS

| | | | |
|---|---|---|---|
| 2018/0357566 A1 | 12/2018 | Liu et al. | |
| 2020/0175053 A1* | 6/2020 | Zheng | G06N 5/046 |
| 2020/0223061 A1* | 7/2020 | Han | G06N 3/08 |
| 2021/0142115 A1* | 5/2021 | Chen | G06V 20/70 |

FOREIGN PATENT DOCUMENTS

| | | |
|---|---|---|
| CN | 109189989 A | 1/2019 |
| CN | 109325148 A | 2/2019 |
| CN | 109359214 A | 2/2019 |
| CN | 109409221 A | 3/2019 |
| CN | 109960747 A | 7/2019 |

OTHER PUBLICATIONS

Written Opinion for PCT/CN2020/079478 dated Jun. 22, 2020 [PCT/ISA/237].

Li et al., "Deep hierarchical attention network for video description", Journal of Electronic Imaging, SPIE—International Society for Optical Engineering, US, vol. 27, No. 2, Mar./Apr. 2018, p. 23027-1 to 23027-7, XP060136203 (8 pages total).

Extended European Search Report dated May 4, 2022 from the European Patent Office in EP application No. 20782577.9.

\* cited by examiner

METHOD AND APPARATUS FOR GENERATING VIDEO DESCRIPTION INFORMATION, AND METHOD AND APPARATUS FOR VIDEO PROCESSING

CROSS-REFERENCE TO RELATED APPLICATION(S)

This application is a bypass continuation application of International Application No. PCT/CN2020/079478, entitled "VIDEO DESCRIPTION INFORMATION GENERATION METHOD, VIDEO PROCESSING METHOD, AND CORRESPONDING DEVICES" and filed Mar. 16, 2020, which claims priority to Chinese Patent Application No. 201910263207.0, entitled "METHOD AND APPARATUS FOR GENERATING VIDEO DESCRIPTION INFORMATION, AND METHOD AND APPARATUS FOR VIDEO PROCESSING" filed with the China National Intellectual Property Administration on Apr. 2, 2019, the disclosures of which are herein incorporated by reference in their entireties.

FIELD

Embodiments of the disclosure relate to the field of image processing technologies, and specifically, the embodiments of the disclosure relate to a method and an apparatus for generating video description information, and a method and an apparatus for video processing.

BACKGROUND

Artificial Intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. In other words, artificial intelligence is a comprehensive technology of computer science, which attempts to understand the essence of intelligence and produce a new type of intelligent machine that can respond to in a similar way to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

The CV is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, CV studies related theories and technologies and attempts to establish an AI system that may obtain information from images or multi-dimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biological feature recognition technologies such as common face recognition and fingerprint recognition.

Natural language processing (NLP) is an important direction in the fields of computer science and AI. It studies various theories and methods that enable effective communication between humans and computers in natural language. NLP is a science that integrates linguistics, computer science, and mathematics. Therefore, studies in this field relate to natural languages, that is, languages used by people in daily life, and NLP is closely related to linguistic studies. The NLP technology generally includes technologies such as text processing, semantic understanding, machine translation, robot question and answer, and knowledge graph.

Under the background of the stable development of Internet and big data, demands for multimedia information are in explosive growth, and traditional information processing technologies cannot deal with the needs of multimedia data on tasks such as labeling and description. Describing a video, an image, or the like in a natural language is a difficult task for machines. This requires machines to bridge a semantic gap in image understanding and correctly integrate two technologies of CV and natural language processing. At present, the research in this direction has received extensive attention and may be effectively applied in the fields of security, home furnishing, medical treatment, and teaching.

The related art technology may already implement automatic description of a video by a machine to a certain extent, but the related art technology mainly converts extracted frame-level features of a video into video-level features, and then directly uses the video-level features as an input of a decoder network to obtain natural language description, and the generated natural language description is often too simple, which may not conform to human language habits, and affect the subsequent understanding and analysis of the video.

SUMMARY

To overcome the foregoing technical problem or at least partially resolve the foregoing technical problem, embodiments of the disclosure provide the following technical solution(s).

According to an aspect of an example embodiment of the disclosure, provided is a video description information generation method, performed by an electronic device, the method including:
 obtaining a frame-level video feature sequence corresponding to a video;
 generating a global part-of-speech sequence feature of the video according to the video feature sequence, the global part-of-speech sequence feature being a feature of a sequence of a combination of parts of speech in the video; and
 generating natural language description information of the video according to the global part-of-speech sequence feature and the video feature sequence.

According to an aspect of an example embodiment of the disclosure, provided is a video processing method based on natural language description information of a video, performed by an electronic device, the method including:

obtaining natural language description information of a video, the natural language description information of the video being obtained by using the foregoing video description information generation method; and correspondingly processing the video based on the natural language description information.

According to an aspect of an example embodiment of the disclosure, provided is a video description information generation apparatus, including:

at least one memory configured to store program code; and at least one processor configured to read the program code and operate as instructed by the program code, the program code comprising:

obtaining code configured to cause at least one of the at least one processor to obtain a frame-level video feature sequence corresponding to a video;

first generation code configured to cause at least one of the at least one processor to generate a global part-of-speech sequence feature of the video according to the video feature sequence, the global part-of-speech sequence feature being a feature of a sequence of a combination of parts of speech in the video; and second generation code configured to cause at least one of the at least one processor to generate natural language description information of the video according to the global part-of-speech sequence feature and the video feature sequence.

According to an aspect of an example embodiment of the disclosure, provided is an apparatus for video processing based on natural language description information of a video, including:

at least one memory configured to store program code; and at least one processor configured to read the program code and operate as instructed by the program code, the program code comprising:

obtaining code configured to cause at least one of the at least one processor to obtain natural language description information of a video, the natural language description information of the video being obtained by using the foregoing video description information generation; and processing code configured to cause at least one of the at least one processor to correspondingly process the video based on the natural language description information.

According to an aspect of an example embodiment of the disclosure, provided is an electronic device, including:

a processor and a memory, the memory storing instructions, the instructions, when executed by the processor, causing the processor to perform the foregoing video description information generation method and/or video processing method.

According to an aspect of an example embodiment of the disclosure, provided is a computer-readable storage medium, storing computer instructions, a program, a code set, or an instruction set, the computer instructions, the program, the code set, or the instruction sets, when run on a computer, causing the computer to perform the method according to the foregoing video description information generation method and/or video processing method.

BRIEF DESCRIPTION OF THE DRAWINGS

The above and/or other aspects will become apparent and more readily appreciated by describing certain example embodiments with reference to the accompanying drawings.

DETAILED DESCRIPTION

Figure 1A:
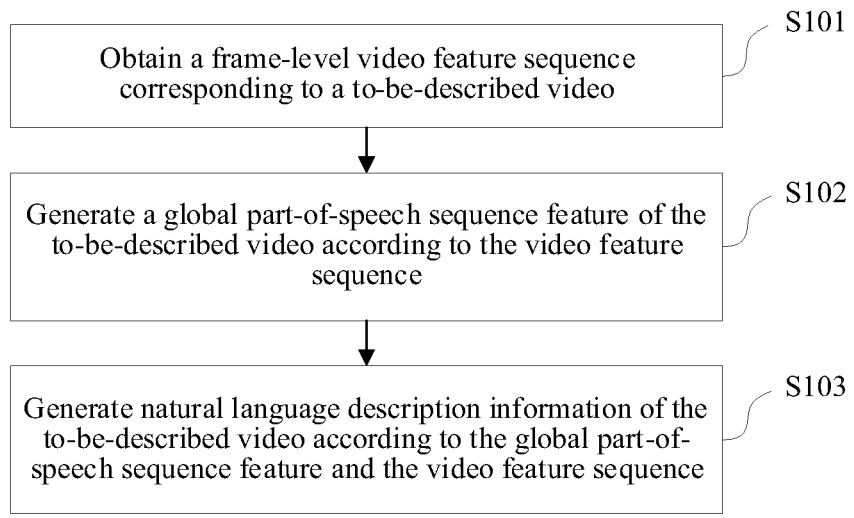
FIG. 1A is a schematic flowchart of a video description information generation method according to an embodiment of the disclosure.

Embodiments of the disclosure are described in detail below, and examples of the embodiments are shown in accompanying drawings, where the same or similar elements or the elements having same or similar functions are denoted by the same or similar reference numerals throughout the description. The embodiments that are described below with reference to the accompany drawings are merely examples, and are only used to fully convey the disclosure and cannot be construed as a limitation to the disclosure.

A person skilled in the art would understand that, the singular forms "a", "an", "said", and "the" used herein may include the plural forms as well, unless the context clearly indicates otherwise. It is to be further understood that, the terms "include" and/or "comprise" used in this specification of the disclosure refer to the presence of stated features, integers, steps, operations, elements, and/or components, but do not preclude the presence or addition of one or more other features, integers, steps, operations, elements, components, and/or combinations thereof. It is to be understood that, when an element is "connected" or "coupled" to another element, the element may be directly connected to or coupled to another element, or an intermediate element may exist. In addition, the "connection" or "coupling" used herein may include a wireless connection or a wireless coupling. The term "and/or" used herein includes all of or any of units and all combinations of one or more related listed items.

To make objectives, technical solutions, and advantages of the embodiments of the disclosure clearer, the following further describes in detail implementations of the disclosure with reference to the accompanying drawings.

The embodiments of the disclosure provide a video description information generation method, performed by an electronic device. The electronic device that performs the video description information generation method will be described in detail later. FIG. 1A is a schematic flowchart of a video description information generation method according to an embodiment of the disclosure. As shown in FIG. 1A, the method includes the following operations.

Operation S101. Obtain a frame-level video feature sequence corresponding to a video.

Operation S102. Generate a global part-of-speech sequence feature of the video according to the video feature sequence.

Operation S103. Generate natural language description information of the video according to the global part-of-speech sequence feature and the video feature sequence.

According to the video description information generation method provided in the embodiments of the disclosure, a global part-of-speech sequence feature corresponding to a natural language may be extracted effectively from video data and may be used for guiding to generate accurate natural language description, to improve a video description capability.

In an example embodiment of the disclosure, the video may be a video that is shot in real time. For example, a video shot by a camera in real time needs to be described in an intelligent monitoring and behavior analysis scenario. In this case, the to-be-described video may be a video shot by the camera in real time. Alternatively, the video may be a video obtained from a network. For example, a video obtained from the network needs to be described by using a natural language in a video content preview scenario, to implement previewing video content by a user. In this case, the video may be a video that needs to be previewed and that is obtained from the network. Alternatively, the video may be a locally stored video. For example, a video needs to be described in a video classification storage scenario and is classified and stored according to description information. In this case, the video may be a video that needs to be classified and stored and that is locally stored.

A person skilled in the art would understand that, the foregoing several scenarios and video sources are only examples, and appropriate changes based on these examples may also be applicable to the disclosure, and the embodiments of the disclosure do not limit the sources and scenarios of the video.

In an example embodiment, the video may be alternatively considered as an image set with consecutive frames, and processing of the video may be processing of each frame of an image in the image set.

In an example embodiment of the disclosure, a frame-level feature is a video feature extracted from each frame of a video image of the video, and the frame-level video feature sequence is a sequence formed by combining a video feature of each frame of video image. For example, a video feature of each frame of an image of the video may be extracted by using a convolutional neural network, and the frame-level video feature sequence is obtained based on the extracted video feature of each frame of an image.

As an example, for a video with m frames of images, a video feature is extracted from each frame of a video image of the video. For example, a video feature extracted from the first frame of an image of the video is $v_1$, a video feature extracted from the second frame of an image of the video is $v_2, \ldots$, and a video feature extracted from the $m^{th}$ frame of an image of the video is $v_m$. A frame-level video feature sequence may be obtained based on the extracted video feature of each frame of an image, that is, $V=\{v_1, v_2, \ldots, v_m\}$.

In an example embodiment of the disclosure, an illustrative implementation for step S101 may be as follows. A convolutional neural network feature is extracted for each frame of the video by using a convolutional neural network (CNN), to obtain the frame-level video feature sequence corresponding to the video, that is, $V=\{v_1, v_2, \ldots, v_m\}$, and the frame-level video feature sequence is directly used in operation S102.

In an example embodiment, there may be a plurality of CNNs for extracting the CNN feature, and choices may be made by a person skilled in the art according to the actual situations. This is not limited in an example embodiment of the disclosure.

In an example embodiment of the disclosure, another illustrative implementation operation S101 may be as follows. The video feature sequence is a video feature sequence including time series information. That is, after the CNN feature (that is, a frame-level video feature) is extracted for each frame of the video by using the CNN, to obtain a CNN feature sequence (that is, the frame-level video feature sequence), time series information of the extracted CNN feature sequence is extracted and fused by using a recurrent neural network, to obtain a frame-level video feature sequence corresponding to the video and having the time series information.

The frame-level video feature sequence with the time series information is provided in a manner such that time series information of the frame-level video feature sequence is extracted based on the frame-level video feature sequence $V=\{v_1, v_2, \ldots, v_m\}$ and according to a time series relationship between frame-level video features ($v_1$ to $v_m$) in a time direction, and the extracted time series information is fused with the frame-level video feature sequence.

As an example, for a video with m frames, after a CNN feature sequence $V=\{v_1, v_2, \ldots, v_m\}$ is obtained, time series information in the sequence V is found by using a recurrent neural network, and the time series information is embedded into the sequence V. An execution process may be represented as:

$$h_i = RNN(v_i, h_{i-1})$$

where RNN represents a general calculation process of the recurrent neural network, and represents a frame-level video feature sequence of the first i–1 frames in which time series information is embedded. After the $i^{th}$ frame of CNN feature is inputted, to obtain a frame-level video feature sequence $h_i$ of the first i frames in which the time series information is embedded, a frame-level video feature sequence of the first frame (in this case, i=1, that is, the first frame) in which the time series information is embedded to a frame-level video feature sequence of the first m frames in which the time series information is embedded are combined, to finally obtain a video feature sequence including the time series information, that is, $H=\{h_1, h_2, \ldots, h_m\}$.

In an example embodiment of the disclosure, the video feature sequence including the time series information $H=\{h_1, h_2, \ldots, h_m\}$ is used for performing operation S102, and the accuracy and the reliability of subsequent video processing may be improved by using the video feature sequence including the time series information.

In an example embodiment, the recurrent neural network for extracting and fusing the time series information may be a recurrent neural network based on a long short-term memory (LSTM) unit, or the like.

Figure 2:
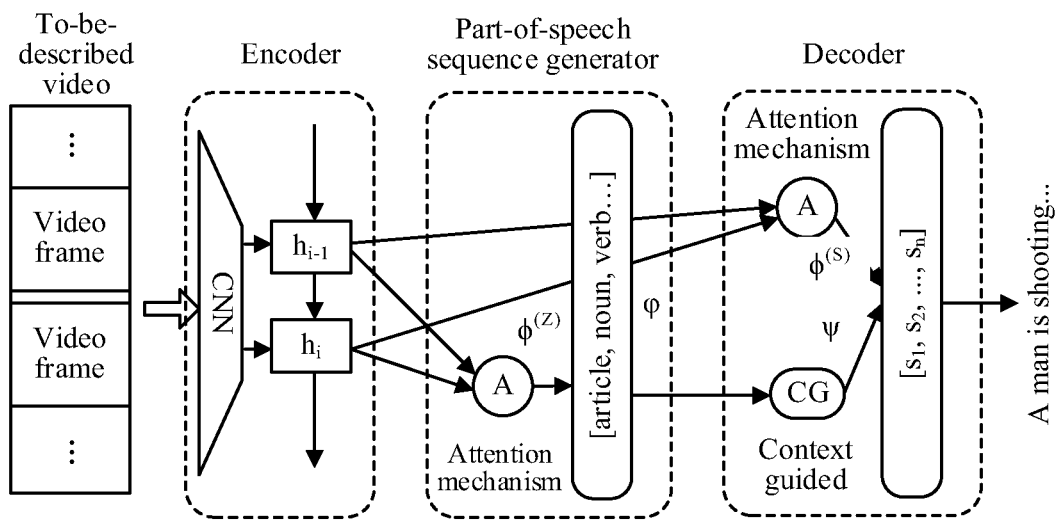
FIG. 2 is a framework and a flowchart of generating natural language description information according to an embodiment of the disclosure.

FIG. 2 is a framework and a flowchart of generating natural language description information according to an embodiment of the disclosure. In an example embodiment of the disclosure, when the electronic device includes an encoder, operation S101 may be performed by the encoder in the electronic device as shown in FIG. 2. The encoder may include a CNN, and after a video is inputted to the encoder, a frame-level video feature sequence corresponding to the video is outputted. Specifically, the video is inputted to the encoder, that is, inputted to the CNN in the encoder, the frame-level video feature sequence corresponding to the video is extracted by using the CNN, the CNN outputs the extracted frame-level video feature sequence as an output of the encoder, and operation S102 is performed by using the video feature sequence outputted by the encoder. Alternatively, the encoder may include a CNN and a recurrent neural network, and after a video is inputted to the encoder, a frame-level video feature sequence corresponding to the video and including time series information is outputted, as shown in an encoder in FIG. 2. Specifically, the video is inputted to the encoder, that is, inputted to the CNN (e.g., corresponding to a CNN in FIG. 2) in the encoder, the frame-level video feature sequence corresponding to the video is extracted by using the CNN, and the CNN outputs the extracted frame-level video feature sequence. The extracted frame-level video feature sequence is inputted to the recurrent neural network (e.g., corresponding to modules such as $h_{i-1}$ and $h_i$ in FIG. 2) in the encoder, time series information of the extracted CNN feature sequence is extracted and fused by using the recurrent neural network, the recurrent neural network outputs the video feature sequence including the time series information as an output of the encoder, and operation S102 is performed by using the video feature sequence outputted by the encoder.

Further, in operation S102 in an example embodiment of the disclosure, when the electronic device includes a part-of-speech sequence generator, the global part-of-speech sequence feature of the video may be generated by using the part-of-speech sequence generator in the electronic device according to the video feature sequence.

That is, potential parts of speech of natural language description of the video are predicted according to the video feature sequence outputted in operation S101, to generate the global part-of-speech sequence feature.

In an example embodiment of the disclosure, a global part-of-speech refers to parts of speech corresponding to natural language description information of the video, a global part-of-speech sequence is a sequence of a combination of the parts of speech, and the global part-of-speech sequence feature is a feature of the sequence of the combination of the parts of speech. A part of speech is an attribute of a character, a word, a phrase, or a word, and a plurality of parts of speech are defined in various languages. As an example, Chinese includes, but is not limited to: parts of speech of noun, verb, adjective, classifier, adverb, preposition, and the like; English includes, but is not limited to: parts of speech of noun, verb, gerund, adjective, adverb, article, preposition, and the like; and in another language, other types of parts of speech may also be included. Details are not described herein. A part-of-speech sequence is relative to a sentence described in a natural language, and the sentence is usually formed by two or more words. A part-of-speech sequence feature is a combination of part-of-speech features of words in the sentence. For example, if potential content of a video is "a man is shooting . . . ", a possible part-of-speech sequence feature is a feature corresponding to [article, noun, verb . . . ]. It would be understood that in a specific application, English letters may be used for representing the parts of speech. For example, 'art.' represents article, 'n.' represents noun, and 'v.' represents verb, that is, the part-of-speech sequence feature is the feature corresponding to [art., n., v. . . . ].

In an example embodiment, to obtain the global part-of-speech sequence feature according to the video feature sequence, operation S102 may include the following operations.

Operation S1021. Determine a fused feature of the video according to the video feature sequence.

Operation S1022. Generate the global part-of-speech sequence feature of the video based on the fused feature of the video by using a first neural network.

The fused feature is a fused video feature obtained after fusion processing is performed on video features in the video feature sequence. There may be a plurality of fusion processing manners that may be used. This is not limited in an example embodiment of the disclosure. For ease of understanding, the following provides two illustrative implementations as examples.

In a first illustrative implementation, in operation S1021, a video feature sequence may be transformed into a fused feature $\phi^{(Z)}$ by using an average feature algorithm, that is, an average value of video features in the video feature sequence is calculated, to obtain the fused feature $\phi^{(Z)}$. Subsequently, the fused feature is inputted to the first neural network, and the global part-of-speech sequence feature of the video is outputted. Fused features inputted at different moments of the first neural network may be the same fused feature $\phi^{(Z)}$.

In a second illustrative implementation, in operation S1021, the video feature sequence obtained in operation S101 may be respectively integrated into different fused features corresponding to moments (for example, a fused feature $\phi_t^{(Z)}$ corresponding to a moment t), for the moments of the first neural network by using a nonlinear network such as a network with an attention mechanism (or referred to as a fusion network). In an example embodiment of the disclosure, the first neural network may be a recurrent neural network. Fused features need to be inputted to the recurrent neural network at different moments in a processing process. The fused features inputted at the moments of the first neural network are fused features corresponding to the moments.

Figure 3:
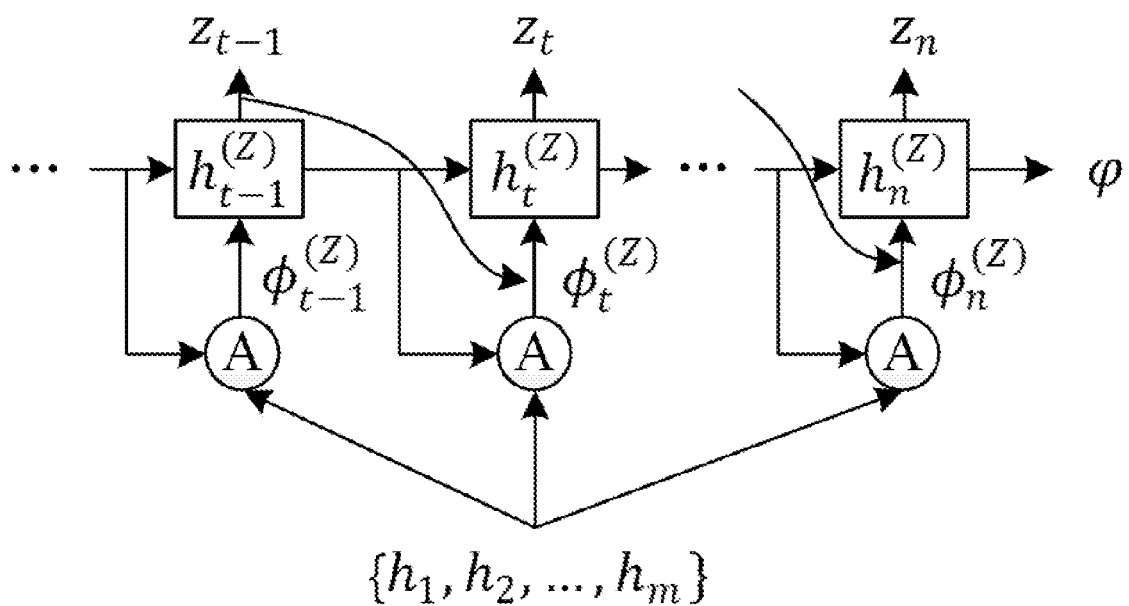
FIG. 3 is a diagram of a module architecture of a part-of-speech sequence feature generator according to an embodiment of the disclosure.

FIG. 3 is a diagram of a module architecture of a part-of-speech sequence feature generator according to an embodiment of the disclosure. As an example, FIG. 3 shows the first neural network (corresponding to a neural network formed by modules such as $h_{t-1}^{(Z)}$, $h_t^{(Z)}$, and $h_{t+1}^{(Z)}$ in FIG. 3) and the fusion network (corresponding to a network A in FIG. 3), and the first neural network in the example is the recurrent neural network. A fused feature inputted at a moment t−1 corresponding to the first neural network is $\phi_{t-1}^{(Z)}$, a fused feature inputted at a moment t corresponding to the first neural network is $\phi_t^{(Z)}$, a fused feature inputted at a moment n corresponding to the first neural network is $\phi_n^{(Z)}$, and so on.

In the second illustrative implementation of the fused feature, weights corresponding to the moments of the first neural network are determined, for example, a weight corresponding to a moment t is $a^t$. The weights (including a weight corresponding to each moment) are weights of frame features in a video feature sequence, for example, a weight of the $i^{th}$ frame feature in the video feature sequence is $a_i$. The frame features in the video feature sequence are fused according to the weights corresponding to the moments (that is, a weight of the first frame feature in the video feature sequence that corresponds to each moment, for example, a weight of the $i^{th}$ frame feature in the video feature sequence that corresponds to the moment t is $a_i^t$), to obtain fused features of the video corresponding to the moments, that is:

$$\phi_t^{(Z)}(H) = \sum_{i=1}^{m} \alpha_i^t h_i$$

where $\phi_t^{(Z)}(H)$ represents a fused feature obtained at the moment t of the first neural network. $a_i^t$ represents a weight dynamically allocated to the $i^{th}$ frame feature by an attention mechanism at the moment t, which meets:

$$\sum_{i=1}^{m} \alpha_i^t = 1$$

It would be understood that a larger weight indicates that a corresponding frame feature is more helpful for prediction of a current part of speech.

In an example embodiment of the disclosure, a weight corresponding to a current moment may be obtained according to a part-of-speech sequence feature determined at a previous moment and frame features in the video feature sequence. Specifically, $a_i^t$ may be obtained as follows:

$$\alpha_i^t = \exp(e_i^t)/\sum_{j=1}^{m}\exp(e_j^t)$$

$$e_i^t = w^T \tanh(Wh_{t-1}^{(Z)} + Uh_i + b)$$

where $w^T$, W, U, and b are trainable parameters, for example, when weights are allocated by using the attention mechanism network, $w^T$, W, U, and b are parameters learned from a process of training the attention mechanism network, exp( ) represents an exponential function, tanh( ) represents a hyperbolic tangent function, or may be used as an activation function, $h_{t-1}^{(Z)}$ represents a part-of-speech sequence feature determined at a previous moment, and $h_i$ represents frame features in a video feature sequence.

Further, in operation S1022, the fused feature obtained in operation S1021 is inputted to the first neural network, and the global part-of-speech sequence feature of the video is outputted.

In an example embodiment of the disclosure, the first neural network may be a recurrent neural network. Specifically, as shown in FIG. 3, the first neural network may include one layer of LSTM unit (corresponding to a neural network formed by modules such as $h_{t-1}^{(Z)}$, $h_t^{(Z)}$, and $h_{t+1}^{(Z)}$ in FIG. 3). An execution process may be represented as:

$$h_t^{(Z)}, c_t^{(Z)} = \text{LSTM}^{(Z)}([E(z_{t-1}), \phi_t^{(Z)}(H)], h_{t-1}^{(Z)})$$

where LSTM$^{(Z)}$ represents a related operation of one layer LSTM unit in the first neural network, $z_{t-1}$ is a part of speech predicted at a previous moment, or may be represented as a memory state $c_{t-1}^{(Z)}$ of the LSTM unit at a previous moment, $\phi_t^{(Z)}(H)$ represents the fused feature corresponding to the moment t of the first neural network, or may be replaced as the same $\phi^{(Z)}(H)$ at the moments, $h_{t-1}^{(Z)}$ represents a part-of-speech sequence feature determined at the previous moment, and also corresponds to a hidden state of the long short-term memory unit at the previous moment, E(·) represents mapping an input to a vector space, and [·] represents a cascade operation. As shown in FIG. 3, a hidden state $h_t^{(Z)}$ and a memory state $c_t^{(Z)}$ of the LSTM unit at a current moment t respectively represent a part-of-speech sequence feature determined at the current moment t and the part of speech $z_t$ predicted at the current moment t.

In this way, as shown in FIG. 3, each part of speech may be predicted, for example, in FIG. 3, $z_{t-1}$ outputted by $h_{t-1}^{(Z)}$, $z_t$ outputted by $h_t^{(Z)}$, $z_{t+1}$ outputted by $h_{t+1}^{(Z)}$, and so on, and a part-of-speech sequence $Z=\{z_1, z_2, \ldots, z_n\}$ and a global part-of-speech sequence feature are obtained. Specifically, after the first neural network determines that the entire part-of-speech sequence is generated, a hidden state of a latest moment includes information about the entire sequence, that is, the global part-of-speech sequence feature:

$$\varphi = h_n^{(Z)}$$

In an example embodiment of the disclosure, as shown in FIG. 2, operation S102 may be performed by using a part-of-speech sequence generator. The part-of-speech sequence generator may include a network (the attention mechanism network A) generating the fused feature and the first neural network. After the video feature sequence is inputted to the part-of-speech sequence generator, the global part-of-speech sequence feature is outputted, as shown in a part-of-speech sequence generator in FIG. 2. Specifically, a video feature sequence $H=\{h_1, h_2, \ldots, h_m\}$ (corresponding to video features including time series information outputted by the modules such as $h_{i-1}$ and $h_i$ in FIG. 2, or may be $V=\{v_1, v_2, \ldots, v_m\}$ directly outputted by the CNN in another embodiment, and for an illustrative application manner, reference may be made to the above descriptions of $H=\{h_1, h_2, \ldots, h_m\}$, and details are not described below again) is inputted to the part-of-speech sequence generator, that is, inputted to the attention mechanism network A in the part-of-speech sequence generator, the video feature sequence $H=\{h_1, h_2, \ldots, h_m\}$ is fused by using the attention mechanism network A, and the attention mechanism network A outputs a fused feature $\varphi^{(Z)}$ and inputs the fused feature $\varphi^{(Z)}$ to the first neural network. The first neural network outputs a predicted global part-of-speech sequence feature φ, for example, the feature corresponding to [article, noun, verb . . . ] shown in FIG. 2, the global part-of-speech sequence feature is used as an output of the part-of-speech sequence generator, and operation S103 is performed by using the global part-of-speech sequence feature outputted by the part-of-speech sequence generator.

In an example embodiment of the disclosure, a probability of predicting each part of speech correctly is represented as follows:

$$P(z_t|z_{<t}, V; \theta_z) = \text{Softmax}(W_z h_t^{(Z)} + b_z)$$

where $W_z$ and $b_z$ represent learnable parameters, for example, parameters learned from a process of training the part-of-speech sequence generator. $\theta_z$ represents all parameters of the part-of-speech sequence generator. $P(z_t|z_{<t}, V, \theta_z)$ represents that a probability of a current part of speech $z_t$ is correctly predicted for a given video V under the premise that part of a part-of-speech sequence $z_{<t} = \{z_1, z_2, \ldots, z_{t-1}\}$ has been predicted.

Further, in operation S103 in an example embodiment of the disclosure, the natural language description information of the video is generated according to the global part-of-speech sequence feature and the video feature sequence.

Figure 4:
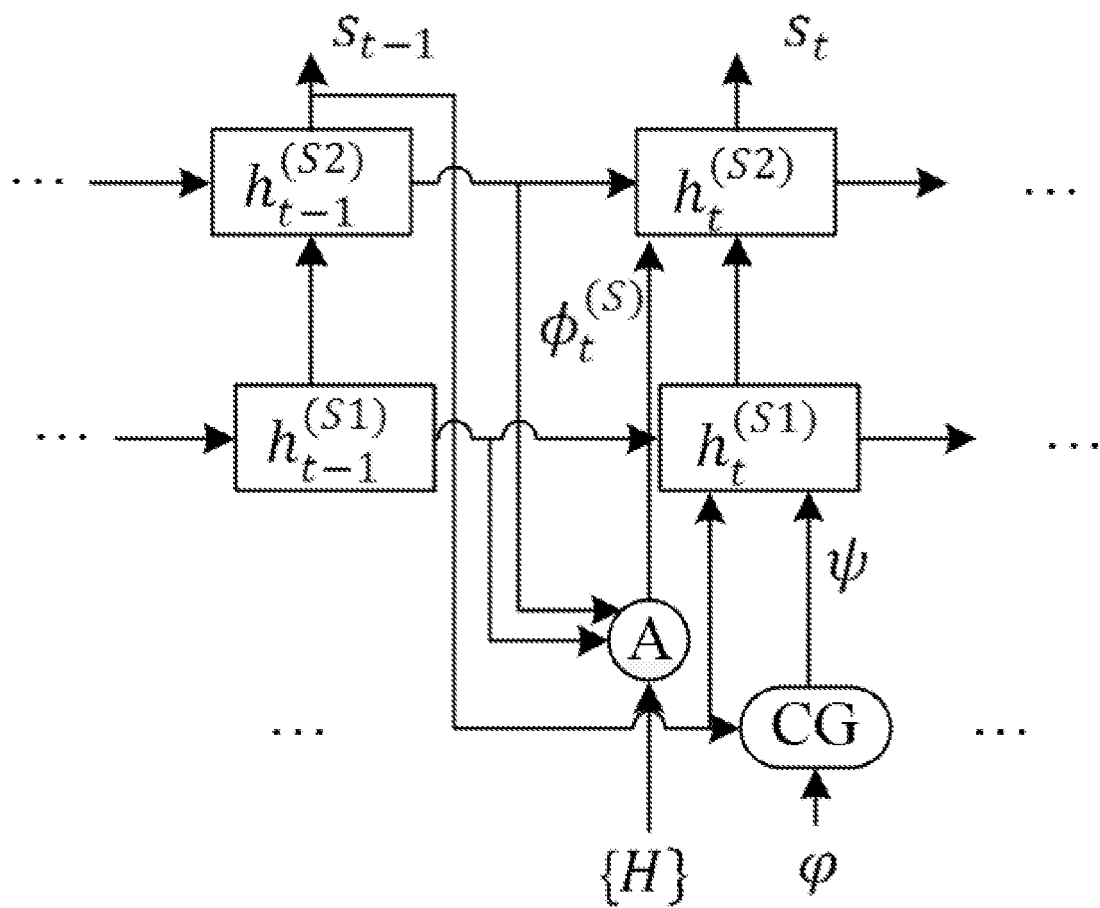
FIG. 4 is a diagram of a module architecture of a decoder according to an embodiment of the disclosure.

FIG. 4 is a diagram of a module architecture of a decoder according to an embodiment of the disclosure. In an example embodiment of the disclosure, referring to FIG. 4, operation S103 may include the following operations.

Operation S1031. Determine a fused feature of the video according to the video feature sequence.

Operation S1032. Generate the natural language description information of the video according to the global part-of-speech sequence feature and the fused feature of the video by using a second neural network.

For an illustrative implementation of operation S1031, reference may be made to operation S1021. As shown in FIG. 4, if the fused feature is determined by using the attention mechanism, in operation S1031, weights corresponding to moments of the second neural network (e.g., corresponding to a neural network formed by modules such as $h_{t-1}^{(S1)}$, $h_{t-1}^{(S2)}$, $h_t^{(S1)}$, and $h_t^{(S2)}$ in FIG. 4) may be calculated by using hidden states of two layers. Weights corresponding to the moments of the first neural network are determined, for example, a weight corresponding to a moment t is $\beta^t$. The weights (including a weight corresponding to each moment) are weights of frame features in a video feature sequence, for example, a weight of the $i^{th}$ frame feature in the video feature sequence is $\beta_i$. The frame features in the video feature sequence are fused according to the weights corresponding to the moments (that is, a weight of the first frame feature in the video feature sequence that corresponds to each moment, for example, a weight of the $i^{th}$ frame feature in the video feature sequence that corresponds to the moment t is $\beta_i^t$, to obtain fused features of the video corresponding to the moments:

$$\phi_t^{(S)}(H) = \sum_{i=1}^m \beta_i^t h_i$$

where $\varphi_t^{(S)}(H)$ represents a fused feature obtained at the moment t of the second neural network. $\beta_i^t$ represents a weight dynamically allocated to the $i^{th}$ frame feature by an attention mechanism at the moment t, which meets:

$$\sum_{i=1}^m \beta_i^t = 1$$

For other corresponding part(s), reference may be made to description in operation S1021, and details are not described herein again.

Further, in operation S1032, the global part-of-speech sequence feature obtained in operation S102 and the fused feature obtained in operation S1031 are inputted to the second neural network, and the natural language description information of the video is outputted.

In an example embodiment of the disclosure, operation S1032 may include the following operations.

Operation SA. Obtain prediction guided information at a current moment in the global part-of-speech sequence feature according to word information corresponding to a previous moment and the global part-of-speech sequence feature.

Operation SB. Obtain word information corresponding to the current moment according to the fused feature of the video and the prediction guided information by using the second neural network.

Operation SC. Generate the natural language description information of the video according to word information corresponding to moments.

In an example embodiment of the disclosure, the word information may include, but is not limited to, a character, a word, a phrase, or a word corresponding to a natural language.

Specifically, operation SA may be implemented by using a cross-gating mechanism:

$$\psi = \sigma(W s_{t-1} + b) \varphi$$

where $s_{t-1}$ represents word information predicted at a previous moment, W and b represent learnable parameters, for example, parameters learned from a process of training the cross-gating mechanism network, and $\sigma(\cdot)$ represents a nonlinear activation function. A function of operation SA is to enhance prediction guided information related to a word to be predicted at a current moment in the global part-of-speech sequence feature by using a word at a previous moment and guide to predict the word at the current moment in operation SB by using the prediction guided information.

In an example embodiment of the disclosure, as shown in FIG. 4, operation SA may be implemented by using a context guided (CG), that is, the prediction guided information at the current moment in the global part-of-speech sequence feature is obtained according to the word information determined at the previous moment and the global part-of-speech sequence feature by using the CG.

As shown in FIG. 4, the second neural network may be a recurrent neural network. Specifically, the recurrent neural network may include double-layer LSTM units (corresponding to a first layer formed by modules such as $h_{t-1}^{(S1)}$ and $h_t^{(S1)}$ and a second layer formed by modules such as $h_{t-1}^{(S2)}$ and $h_t^{(S2)}$ in FIG. 4), that is, in operation SB, the word information corresponding to the current moment is obtained according to the fused feature of the video and the prediction guided information by using the double-layer LSTM units. An execution process may be represented as:

$$h_t^{(S1)}, c_t^{(S1)} = \text{LSTM}^{(S1)}([E(s_{t-1}), \psi], h_{t-1}^{(S1)}) \quad \text{Formula 1}$$

$$h_t^{(S2)}, c_t^{(S2)} = \text{LSTM}^{(S2)}([h_t^{(S1)}, \phi_t^{(S)}(H)], h_{t-1}^{(S2)}) \quad \text{Formula 2}$$

where $\text{LSTM}^{(S1)}$ and $\text{LSTM}^{(S2)}$ respectively represent related operations of the first layer of LSTM unit and the second layer of LSTM unit in the second neural network, $S_{t-1}$ is word information predicted at a previous moment, or may be represented as a hidden state $h_{t-1}^{(S2)}$ of the second layer of LSTM unit at a previous moment, ii represents prediction guided information related to a word to be predicted at a current moment and outputted by the CG, $h_{t-1}^{(S1)}$ represents a hidden state of the first layer of LSTM unit at the previous moment and may be used as an input of the first layer of LSTM unit at the current moment, $E(\cdot)$ represents mapping the input to a vector space, and $[\cdot]$ represents a cascade operation. As shown in FIG. 4, a memory state $c_t^{(S1)}$ and a hidden state $h_t^{(S1)}$ (corresponding to an output at a right side of $h_t^{(S1)}$ in FIG. 4) of the first layer of LSTM unit at the current moment may be obtained by using formula 1 as an input of the first layer of LSTM unit at a next moment, and the hidden state $h_t^{(S1)}$ of the first layer of LSTM unit at the current moment is used as an input (corresponding to an output at an upper side of $h_t^{(S1)}$ in FIG. 4) of the second layer of LSTM unit at the current moment. $\phi_t^{(S)}(H)$ represents a fused feature corresponding to a moment t of the second neural network, or may be replaced with the same $\phi^{(S)}(H)$ at moments, and $h_{t-1}^{(S2)}$ represents a hidden state of the second layer of LSTM unit at the previous moment and may be used as an input of the second layer of LSTM unit at the current moment. A memory state $c_t^{(S2)}$ and a hidden state $h_t^{(S2)}$ of the second layer of LSTM unit at the current moment may be obtained by using formula 2, and the hidden state $h_t^{(S2)}$ (corresponding to an output at an upper side of $h_t^{(S2)}$ in FIG. 4) of the second layer of LSTM unit at the current moment is word information $S_t$ predicted at the current moment.

It would be understood that for another recurrent neural network, two outputs of the layers in the process are hidden states h, and prediction of word information may also be implemented.

In this way, the second neural network may predict natural language description word by word, for example, in FIG. 4, $S_{t-1}$ outputted by $h_{t-1}^{(S2)}$, $S_t$ outputted by $h_t^{(S2)}$, and so on. Further, in operation SC, the natural language description information $S=\{s_1, s_2, \ldots, s_n\}$ of the video may be generated according to word information $s_1, s_2, \ldots, s_n$ corresponding to the moments.

In an example embodiment of the disclosure, as shown in FIG. 2, when the electronic device includes a decoder, operation S103 may be performed by the decoder in the electronic device. The decoder may include a network (the attention mechanism network A) generating the fused feature and the second neural network, and after the video feature sequence and the global part-of-speech sequence feature are inputted to the decoder, the natural language description information of the video is outputted, as shown in the decoder in FIG. 2. Specifically, a video feature sequence $H=\{h_1, h_2, \ldots, h_m\}$ (corresponding to the video features including the time series information outputted by the modules such as $h_{i-1}$ and $h_i$ in FIG. 2, in another embodiment, or may be $V=\{v_1, v_2, \ldots, v_m\}$ directly outputted by the CNN, and for an illustrative implementation, reference may be made to the above descriptions of $H=\{h_1, h_2, \ldots, h_m\}$, and details are not described below again) and a global part-of-speech sequence feature (p are inputted to the decoder. The video feature sequence $H=\{h_1, h_2, \ldots, h_m\}$ is inputted to the attention mechanism network A in the decoder, and the video feature sequence $H=\{h_1, h_2, \ldots, h_m\}$ is fused by using the attention mechanism network A, the attention mechanism network A outputs a fused feature $\phi^{(S)}$, and the fused feature $\phi^{(S)}$ is inputted to the second neural network. The global part-of-speech sequence feature $\phi$ is inputted to a CG (corresponding to a guided module in FIG. 2) in the decoder, prediction guided information related to a word to be predicted at a current moment in the global part-of-speech sequence feature is enhanced by using the CG by using a word, the CG outputs the prediction guided information, and the prediction guided information is inputted to the second neural network. The second neural network outputs predicted word information, for example, $[s_1, s_2, \ldots, s_n]$ shown in FIG. 2, as an output of the decoder, for example, an output sentence "a man is shooting" shown in FIG. 2.

In an example embodiment of the disclosure, the network generating the fused feature included in the part-of-speech sequence generator and the network (the attention mechanism network A) generating the fused feature included in the decoder may be the same or may be different, that is, may be disposed alone or may be encapsulated into one network. This is not limited in an example embodiment of the disclosure.

In an example embodiment of the disclosure, a probability of predicting each piece of word information correctly is represented as follows:

$$P(s_t|s_{<t}, V; \theta_s) = \text{Softmax}(W_s h_t^{(S2)} + b_s)$$

where $W_s$ and $b_s$ represent learnable parameters, for example, parameters learned from a process of training the decoder. $\theta_s$ represents all parameters of the decoder. The Softmax function converts the hidden state of the second layer of LSTM unit at the current moment in the decoder into probability distribution of each piece of word information, and predicts the most possible word information from the probability distribution. When the decoder meets a termination condition, complete natural language description information is obtained.

In an example embodiment of the disclosure, in addition to the extraction manner and the guide manner of the global part-of-speech sequence feature described above, any other neural network and nonlinear network that may be used in the method for generating video description information and that are used for improving the accuracy of video description also fall within the protection scope of an example embodiment of the disclosure.

In an example embodiment of the disclosure, the entire network shown in FIG. 2 may be trained by minimizing a model loss function $$\min_\theta \mathcal{L}(\theta)$$

in an end-to-end manner.

Specifically, a loss function in the training process may be represented as:

$$\mathcal{L}_{(\theta_z,\theta_s)} = \lambda \mathcal{L}_{(\theta_z)} + (1-\lambda) \mathcal{L}_{(\theta_s)}$$

$$\mathcal{L}(\theta_z) = \sum_{k=1}^{N} \{-\log P(Z^k|V^k; \theta_z)\}$$

$$\mathcal{L}(\theta_s) = \sum_{k=1}^{N} \{-\log P(S^k|V^k; \theta_s)\}$$

where $\lambda$ is a balance parameter used for balancing impact of losses of the part-of-speech sequence generator and the decoder. N represents a quantity of pieces of training data. For each piece of training data, the losses of the part-of-speech sequence generator and the decoder may be represented as:

$$P(Z^k|V^k; \theta_z) = \sum_{t}^{n} P(s_t^k|s_{<t}^k, V^k; \theta_z)$$

$$P(S^k|V^k; \theta_s) = \sum_{t}^{n} P(s_t^k|s_{<t}^k, V^k; \theta_s)$$

In an example embodiment of the disclosure, by using the part-of-speech sequence generator and the CG, a semantic relationship between a part-of-speech sequence of natural language description information and a video feature sequence of a video may be effectively mined, and a larger feature utilization space is provided for the decoder. Compared with the related art in which only a video-level visual feature is used, but impact of a part of speech in a natural language is ignored, in an example embodiment of the disclosure, accurate natural language description information may be generated for the video, and performance of generating video description information is improved, thereby helping to understand and analyze a video, for example, performing video classification and retrieval, and achieving potential economic benefits.

The following describes an implementation process of the video description information generation method provided in the disclosure as a whole by using an example in which content of a video is that a man is playing basketball. As shown in FIG. 2, video frames of the video (corresponding to an input video in FIG. 2) are inputted to the encoder, that is, inputted to a CNN (corresponding to a CNN in FIG. 2) in the encoder, a frame-level video feature sequence corresponding to the video is extracted by using the CNN, and the CNN outputs the extracted frame-level video feature sequence. The extracted frame-level video feature sequence is inputted to a recurrent neural network (corresponding to modules such as $h_{i-1}$ and $h_i$ in FIG. 2) in the encoder, time series information of the extracted CNN feature sequence is extracted and fused by using the recurrent neural network, and the recurrent neural network outputs the video feature sequence (for ease of description, which is referred to as an advanced video feature sequence) including the time series information as an output of the encoder. The advanced video sequence feature outputted by the encoder is inputted to the part-of-speech sequence generator, that is, inputted to the attention mechanism network A in the part-of-speech sequence generator, the advanced video sequence feature is fused by using the attention mechanism network A, the attention mechanism network A outputs a fused feature $\phi^{(Z)}$ and the fused feature is inputted to a single-layer LSTM network. The single-layer LSTM network outputs a predicted global part-of-speech sequence feature φ, for example, the feature corresponding to [article, noun, verb . . . ] shown in FIG. 2, and the global part-of-speech sequence feature is used as an output of the part-of-speech sequence generator. The advanced video sequence feature outputted by the encoder and the global part-of-speech sequence feature φ outputted by the part-of-speech sequence generator are inputted to the decoder. The advanced video sequence feature is inputted to the attention mechanism network A in the decoder, the advanced video sequence feature is fused by using the attention mechanism network A, the attention mechanism network A outputs a fused feature $\phi^{(S)}$, and the fused feature is inputted to a double-layer LSTM memory network. The global part-of-speech sequence feature φ is inputted to the CG (corresponding to the guided module in FIG. 2) in the decoder, prediction guided information related to a word to be predicted at a current moment in the global part-of-speech sequence feature is enhanced by using the CG by using a word, the CG outputs the prediction guided information, and the prediction guided information is inputted to the double-layer LSTM network. The double-layer LSTM network outputs predicted word information, for example, [$s_1$, $s_2$, . . . , $s_n$] shown in FIG. 2, as an input of the decoder. Finally, the decoder outputs natural language description information "a man is shooting".

In an example embodiment, the encoder, the part-of-speech sequence generator, and the decoder may be integrated into a function network. During training, the encoder, the part-of-speech sequence generator, and the decoder may be trained separately, or the function network may be directly trained. In an example embodiment, the method may be applied in an online process, in which a video is inputted to the function network, and natural language description information may be automatically outputted.

The video description information generation method (or the function module) provided in the embodiments of the disclosure may be deployed on a terminal for describing a video that is shot in real time, download, or locally stored, or may be deployed on a cloud server for describing a video that is in a database or received.

The video description information generation method provided in the embodiments of the disclosure may be used for providing a video content understanding service, or may be deployed on a video website for video classification and rapid retrieval, or combined with a speech system for assisting the visually impaired.

Figure 1B:
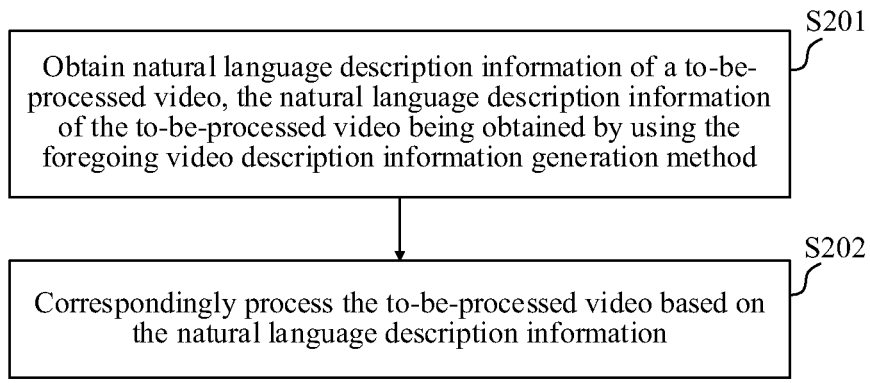
FIG. 1B is a schematic flowchart of a video processing method based on natural language description information of a video according to an embodiment of the disclosure.

Specifically, the embodiments of the disclosure further provide a video processing method based on natural language description information of a video, performed by an electronic device described below. FIG. 1B is a schematic flowchart of a video processing method based on natural language description information of a video according to an embodiment of the disclosure. The method includes the following operations.

Operation S201. Obtain natural language description information of a video, the natural language description information of the video being obtained by using the video description information generation method according to any one of the foregoing embodiments.

The video may be a video shot in real time, for example, a user behavior needs to be classified in an intelligent monitoring and behavior analysis scenario. In this case, the video may be a video shot by a camera in real time, or the video may be a video obtained from a network, for example, a video needs to be classified in a video website or application, and rapid retrieval or video recommendation may be implemented based on a classification result. In this case, the video may be a video that is obtained from the network and needs to be previewed, or the video may be a locally stored video.

A person skilled in the art would understand that, the foregoing several scenarios and video sources are only examples, and appropriate changes based on these examples may also be applicable to the disclosure, and the embodiments of the disclosure do not limit the sources and scenarios of the video.

In an example embodiment of the disclosure, it may be alternatively considered that the video is inputted to the function network, and the natural language description information of the video is automatically outputted. For an illustrative implementation, reference may be made to description of the embodiments above, and details are not described herein again.

Operation S202. Process the video based on the natural language description information.

Specifically, the processing the video includes at least one of the following:

video classification, video retrieval, and generating prompt information corresponding to the video.

For example, the processing the video is to perform video classification on the video. In an implementation, the video may be classified based on the generated natural language description information by using a classification network.

Specifically, in the classification network, a text feature may be first extracted from the natural language description information by using a feature extraction network, and then classification is performed based on the text feature by using a classifier.

Specifically, after the natural language description information is obtained in operation S201, the natural language description information is inputted to the classification network, that is, inputted to the feature extraction network in the classification network, a text feature of the natural language description information is outputted, the text feature outputted by the feature extraction network is inputted to the classifier in the classification network, and a classification result of the video is outputted and used as an output of the classification network.

According to the video processing method based on natural language description information of a video provided in the embodiments of the disclosure, when the method is used for video classification, a video may be automatically recognized, natural language description information of the video is outputted, and the video may be classified based on the natural language description information of the video, thereby effectively improving efficiency and precision of video classification.

For example, the processing the video is to perform video retrieval on the video. In an implementation, after the natural language description information of the video is obtained, the natural language description information of the video is pre-stored. When video retrieval is performed, a retrieval condition is received, and the retrieval condition matches the stored natural language description information of the video. When matching succeeds, the video corresponding to the natural language description information is obtained based on the successfully matched natural language description information, and the obtained video is used as a retrieval result for displaying.

In an implementation, to improve retrieval efficiency, the video classification method may be combined, and after the natural language description information of the video is obtained, the natural language description information of the video is classified and stored in advance. When video retrieval is performed, a retrieval condition is received, classification on a video corresponding to the retrieval condition is determined, and the retrieval condition matches the stored natural language description information of the video in the corresponding classification. When matching succeeds, the video corresponding to the natural language description information is obtained based on the successfully matched natural language description information, and the obtained video is used as a retrieval result for displaying.

According to the video processing method based on natural language description information of a video provided in the embodiments of the disclosure, when the method is used for video retrieval, a video may be automatically recognized, natural language description information of the video is outputted, and the video may be retrieved based on the natural language description information of the video, thereby effectively improving efficiency and precision of video retrieval.

For example, the processing the video is to generate the prompt information corresponding to the video. In an implementation, after the natural language description information of the video is obtained, the obtained natural language description information is converted into audio information as the prompt information corresponding to the video. A specific implementation of converting natural language description information into audio information is not limited in the embodiments of the disclosure, and a person skilled in the art may set according to an actual situation. The prompt information may be used for assisting user in understanding video content. For example, the prompt information may be used for assisting the visually impaired in understanding video content by using auditory sensation. In another embodiment, the prompt information corresponding to the video generated according to the obtained natural language description information may be alternatively another type of information.

According to the video processing method based on natural language description information of a video provided in the embodiments of the disclosure, when the method is used for assisting in video understanding, a video may be automatically recognized, natural language description information of the video is outputted, and prompt information corresponding to the video may be generated based on the natural language description information of the video, thereby effectively assisting a user in understanding a video.

A person skilled in the art would understand that the service scenario is only an example, and appropriate changes based on the example may be used in another scenario, or may belong to the spirit or scope of the disclosure.

Figure 5:
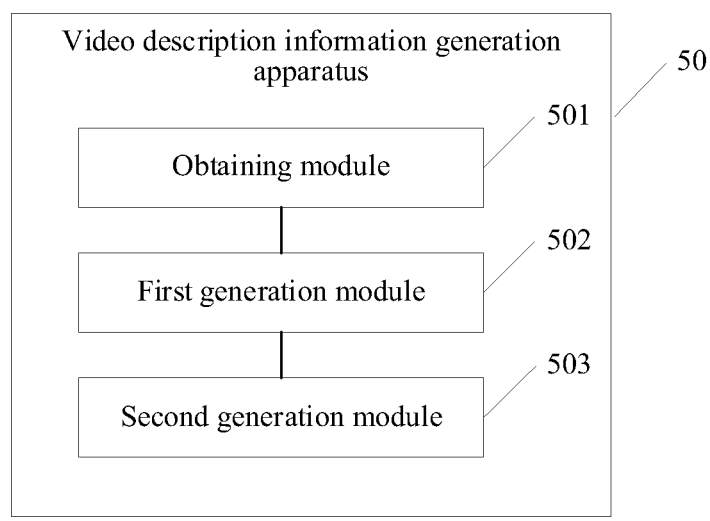
FIG. 5 is a schematic structural diagram of a video description information generation apparatus according to an embodiment of the disclosure.

The embodiments of the disclosure further provide a video description information generation apparatus. FIG. 5 is a schematic structural diagram of a video description information generation apparatus according to an embodiment of the disclosure. As shown in FIG. 5, the generation apparatus 50 may include: an obtaining module 501, a first generation module 502, and a second generation module 503.

The obtaining module 501 is configured to obtain a frame-level video feature sequence corresponding to a video.

The first generation module 502 is configured to generate a global part-of-speech sequence feature of the video according to the video feature sequence.

The second generation module 503 is configured to generate natural language description information of the video according to the global part-of-speech sequence feature and the video feature sequence.

In an implementation, the video feature sequence is a video feature sequence including time series information.

In an implementation, the first generation module 502 is configured to determine a fused feature of the video according to the video feature sequence, and generate the global part-of-speech sequence feature of the video according to the fused feature of the video.

In an implementation, the first generation module 502 is configured to determine weights corresponding to moments of a first neural network, weights being weights of frame features in the video feature sequence; and respectively fuse the frame features in the video feature sequence according to the weights corresponding to the moments, to obtain the fused features of the video that correspond to the moments.

In an implementation, the first generation module 502 is configured to obtain the weight corresponding to a current moment according to a part-of-speech sequence feature determined at a previous moment and the frame features in the video feature sequence.

In an implementation, the first neural network is an LSTM network.

In an implementation, the second generation module 503 is configured to determine a fused feature of the video according to the video feature sequence, and generate natural language description information of the video according to the global part-of-speech sequence feature and the fused feature of the video.

In an implementation, the second generation module 503 is configured to determine weights corresponding to moments of a second neural network, weights being weights of frame features in the video feature sequence; and respectively fuse the frame features in the video feature sequence according to the weights corresponding to the moments, to obtain the fused features of the video that correspond to the moments.

In an implementation, the second generation module 503 is configured to obtain prediction guided information at a current moment in the global part-of-speech sequence feature according to word information corresponding to a previous moment and the global part-of-speech sequence feature; obtain word information corresponding to the current moment according to the fused feature of the video and the prediction guided information by using a second neural network; and generate the natural language description information of the video according to word information corresponding to the moments.

In an implementation, the second neural network is an LSTM network.

In an implementation, the second generation module 503 is configured to obtain the prediction guided information at the current moment in the global part-of-speech sequence feature according to the word information determined at the previous moment and the global part-of-speech sequence feature by using a CG.

According to the video description information generation apparatus provided in an example embodiment of the disclosure, a semantic relationship between a part-of-speech sequence of natural language description information and a video feature sequence of a video may be effectively mined, and a larger feature utilization space is provided for the decoder. Compared with the related art in which only a video-level visual feature is used, but impact of part of speech in a natural language is ignored, in an example embodiment of the disclosure, accurate natural language description information may be generated for the video, and performance of generating video description information is improved, thereby helping to understand and analyze a video, for example, performing video classification and retrieval, and achieving potential economic benefits.

A person skilled in the art would clearly understand that an implementation principle and a technical effect of the video description information generation apparatus provided in the embodiments of the disclosure are the same as those of the foregoing method embodiments. For the convenience and conciseness of the description, for the parts not mentioned in the apparatus embodiment, reference may be made to the corresponding content in the foregoing method embodiment, and details are not described herein again.

The embodiments of the disclosure further provide an apparatus for video processing based on natural language description information of a video, and the apparatus for video processing may include: an obtaining module and a processing module.

The obtaining module is configured to obtain natural language description information of a video, the natural language description information of the video being obtained by using the video description information generation method according to any one of the foregoing embodiments.

The processing module is configured to process the video based on the natural language description information.

In an implementation, the processing the video includes at least one of the following:

video classification, video retrieval, and generating prompt information corresponding to the video.

A person skilled in the art would clearly understand that an implementation principle and a technical effect of the apparatus for video processing based on natural language description information of a video provided in the embodiments of the disclosure are the same as those of the foregoing method embodiments. For the convenience and conciseness of the description, for the parts not mentioned in the apparatus embodiment, reference may be made to the corresponding content in the foregoing method embodiment, and details are not described herein again.

The embodiments of the disclosure further provide an electronic device, including a processor and a memory, the memory storing instructions, the instructions, when executed by the processor, causing the processor to perform the corresponding method in the foregoing method embodiments.

In an example, the electronic device may include the encoder shown in FIG. 2, the decoder, and the part-of-speech sequence generator.

In an example, the electronic device may further include a transceiver. The processor is connected to the transceiver by a bus. In an example embodiment, there may be one or more transceivers. The structure of the electronic device does not constitute a limitation on an example embodiment of the disclosure.

The processor may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or perform various examples of logic blocks, modules, and circuits described with reference to content disclosed in the embodiments of the disclosure. The processor may alternatively be a combination to implement a computing function, for example, may be a combination of one or more microprocessors, or a combination of a DSP and a microprocessor.

The bus may include a channel, to transmit information between the foregoing components. The bus may be a peripheral component interconnect (PCI) bus, an extended industry standard architecture (EISA) bus, or the like. The bus may be classified as an address bus, a data bus, a control bus, or the like. The memory may be a read only memory (ROM) or another type of static storage device that may store static information and a static instruction; or a random access memory (RAM) or another type of dynamic storage device that may store information and an instruction; or may be an electrically erasable programmable read-only memory (EEPROM), a compact disc (CD)-ROM or another compact-disc storage medium, optical disc storage medium (including a compact disc, a laser disk, an optical disc, a digital versatile disc, a Blu-ray disc, or the like) and magnetic disk storage medium, another magnetic storage device, or any other medium that may be configured to carry or store expected program code in a form of an instruction or a data structure and that is accessible by a computer, but is not limited thereto.

According to the electronic device provided in the embodiments of the disclosure, a semantic relationship between a part-of-speech sequence of natural language description information and a video feature sequence of a video may be effectively mined, and a larger feature utilization space is provided for the decoder. Compared with the related art in which only a video-level visual feature is used, but impact of part of speech in a natural language is ignored, in an example embodiment of the disclosure, accurate natural language description information may be generated for the video, and performance of generating video description information is improved, thereby helping to understand and analyze a video, for example, performing video classification and retrieval, and achieving potential economic benefits.

The embodiments of the disclosure further provide a storage medium, for example, a computer-readable storage medium, the computer-readable storage medium being configured to store computer instructions, the computer instructions, when run on a computer, causing the computer to perform corresponding operation in the foregoing method embodiments. In the embodiments of the disclosure, a global part-of-speech sequence feature corresponding to a natural language may be extracted effectively from video data and may be used for guiding to generate accurate natural language description, to improve a video description capability.

It is to be understood that, although the operations in the flowchart in the accompanying drawings are sequentially shown according to indication of an arrow, the operations are not necessarily sequentially performed according to a sequence indicated by the arrow. Unless explicitly specified in this specification, execution of the operations is not strictly limited in the sequence, and the operations may be performed in other sequences. In addition, at least some operations in the flowcharts in the accompanying drawings may include a plurality of suboperations or a plurality of stages. The suboperations or the stages are not necessarily performed at the same moment, but may be performed at different moments. The suboperations or the stages are not necessarily performed in sequence, but may be performed in turn or alternately with another operation or at least some of suboperations or stages of the another operation.

According to the video description information generation method and apparatus, the electronic device, and the readable medium provided in the embodiments of the disclosure, in a manner in which a frame-level video feature sequence corresponding to a video is obtained; a global part-of-speech sequence feature of the video is generated according to the video feature sequence; and natural language description information of the video is generated according to the global part-of-speech sequence feature and the video feature sequence. Accordingly, a global part-of-speech sequence feature corresponding to a natural language may be extracted effectively from video data and may be used for guiding to generate accurate natural language description, to improve a video description capability.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing descriptions are merely example embodiments of the disclosure and are not intended to limit the disclosure. Any modification, equivalent replacement, or improvement and the like made within the spirit and principle of the disclosure fall within the protection scope of the disclosure.

What is claimed is:

1. A video description information generation method, performed by an electronic device, the method comprising:
    obtaining a video feature sequence on a frame level corresponding to a video;
    generating a global part-of-speech sequence feature of the video according to the video feature sequence, the global part-of-speech sequence feature being a feature of a sequence of a combination of parts of speech in the video; and
    generating natural language description information of the video according to the global part-of-speech sequence feature and the video feature sequence,
    wherein the generating the global part-of-speech sequence feature comprises:
    determining a fused feature of the video according to the video feature sequence; and
    generating the global part-of-speech sequence feature of the video based on the fused feature of the video by using a first neural network, and
    wherein the determining the fused feature comprises:
    determining weights corresponding to moments of the first neural network, the weights being weights of frame features in the video feature sequence; and
    respectively fusing the frame features in the video feature sequence according to the weights corresponding to the moments, to obtain fused features of the video that correspond to the moments.

2. The generation method according to claim 1, wherein the video feature sequence includes time series information.

3. The generation method according to claim 1, wherein the determining the weights comprises:
    obtaining a weight corresponding to a current moment according to a part-of-speech sequence feature determined at a previous moment and the frame features in the video feature sequence.

4. The generation method according to claim 1, wherein the first neural network comprises a long short-term memory network.

5. The generation method according to claim 1, wherein the generating the natural language description information comprises:
    determining a fused feature of the video according to the video feature sequence; and
    generating the natural language description information of the video according to the global part-of-speech sequence feature and the fused feature of the video by using a second neural network.

6. The generation method according to claim 5, wherein the determining the fused feature comprises:
    determining weights corresponding to moments of the second neural network, the weights corresponding to moments of the second neural network being weights of frame features in the video feature sequence; and
    respectively fusing the frame features in the video feature sequence according to the weights corresponding to the moments of the second neural network, to obtain fused features of the video that correspond to the moments.

7. The generation method according to claim 5, wherein the generating the natural language description information comprises:

obtaining prediction guided information at a current moment in the global part-of-speech sequence feature according to word information corresponding to a previous moment and the global part-of-speech sequence feature;

obtaining word information corresponding to the current moment according to the fused feature of the video and the prediction guided information by using the second neural network; and generating the natural language description information of the video according to word information corresponding to moments.

8. The generation method according to claim 7, wherein the obtaining the prediction guided information comprises:

obtaining the prediction guided information at the current moment in the global part-of-speech sequence feature according to the word information determined at the previous moment and the global part-of-speech sequence feature by using a context guided.

9. A video processing method based on natural language description information of a video, performed by an electronic device, the method comprising:

obtaining natural language description information of a video, the natural language description information of the video being obtained by using the method according to claim 1; and processing the video based on the natural language description information.

10. The video processing method according to claim 9, wherein the processing the video comprises at least one of the following:

video classification, video retrieval, or generating prompt information corresponding to the video.

11. The video processing method according to claim 9, wherein the processing the video comprises:

inputting the obtained natural language description information of the video to a classification network to obtain a text feature of the natural language description information; and inputting the text feature to a classifier of the classification network, to obtain a classification result of the video.

12. The video processing method according to claim 9, wherein the processing the video comprises:

converting the obtained natural language description information into audio information as prompt information corresponding to the video.

13. An electronic device, comprising a processor and a memory, the memory storing instructions, the instructions being executable by the processor to cause the processor to perform the method according to claim 1.

14. A non-transitory computer-readable storage medium, storing computer program, the computer program being executable by at least one processor to cause the at least one processor to perform the method according to claim 1.

15. A video description information generation apparatus, comprising:

at least one memory configured to store program code; and at least one processor configured to read the program code and operate as instructed by the program code, the program code comprising:

obtaining code configured to cause at least one of the at least one processor to obtain a video feature sequence on a frame level corresponding to a video;

first generation code configured to cause at least one of the at least one processor to generate a global part-of-speech sequence feature of the video according to the video feature sequence, the global part-of-speech sequence feature being a feature of a sequence of a combination of parts of speech in the video; and second generation code configured to cause at least one of the at least one processor to generate natural language description information of the video according to the global part-of-speech sequence feature and the video feature sequence, wherein the first generation code is further configured to cause at least one of the at least one processor to determine a fused feature of the video according to the video feature sequence; and generate the global part-of-speech sequence feature of the video based on the fused feature of the video by using a first neural network, and wherein the determining the fused feature comprises:

determining weights corresponding to moments of the first neural network, the weights being weights of frame features in the video feature sequence; and respectively fusing the frame features in the video feature sequence according to the weights corresponding to the moments, to obtain fused features of the video that correspond to the moments.

16. The apparatus according to claim 15, wherein the first generation code is configured to cause at least one of the at least one processor to determine a fused feature of the video according to the video feature sequence; and generate the natural language description information of the video according to the global part-of-speech sequence feature and the fused feature of the video by using a second neural network.

17. An apparatus for video processing based on natural language description information of a video, the apparatus comprising:

at least one memory configured to store program code; and at least one processor configured to read the program code and operate as instructed by the program code, the program code comprising:

obtaining code configured to cause at least one of the at least one processor to obtain natural language description information of a video, the natural language description information of the video being obtained by:

obtaining a video feature sequence on a frame level corresponding to the video;

generating a global part-of-speech sequence feature of the video according to the video feature sequence, the global part-of-speech sequence feature being a feature of a sequence of a combination of parts of speech in the video; and generating the natural language description information of the video according to the global part-of-speech sequence feature and the video feature sequence; and processing code configured to cause at least one of the at least one processor to process the video based on the natural language description information, wherein the generating the global part-of-speech sequence feature comprises:

determining a fused feature of the video according to the video feature sequence; and generating the global part-of-speech sequence feature of the video based on the fused feature of the video by using a first neural network, and wherein the determining the fused feature comprises:
  determining weights corresponding to moments of the first neural network, the weights being weights of frame features in the video feature sequence; and
  respectively fusing the frame features in the video feature sequence according to the weights corresponding to the moments, to obtain fused features of the video that correspond to the moments.

* * * * *